(12) United States Patent
Kolati et al.

(10) Patent No.: US 12,236,919 B2
(45) Date of Patent: Feb. 25, 2025

(54) IMAGE DISPLAY APPARATUS AND METHOD FOR MANAGING DATA PACKET LOSS

(71) Applicant: Samsung Electronics Co., Ltd., Suwon-si (KR)

(72) Inventors: Naveen Kolati, Bangalore (IN); Sreekanth Majji, Bangalore (IN); Ravi Surana, Bangalore (IN); Vinayak Goyal, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 106 days.

(21) Appl. No.: 17/212,457

(22) Filed: Mar. 25, 2021

(65) Prior Publication Data
US 2021/0304705 A1  Sep. 30, 2021

(30) Foreign Application Priority Data

Mar. 27, 2020 (IN) .............................. 202041013380
Aug. 5, 2020 (KR) ........................ 10-2020-0098116

(51) Int. Cl.
*G09G 5/14* (2006.01)
*G06F 3/01* (2006.01)
(Continued)

(52) U.S. Cl.
CPC ............... *G09G 5/14* (2013.01); *G06F 3/013* (2013.01); *G09G 3/003* (2013.01); *H04L 1/08* (2013.01);
(Continued)

(58) Field of Classification Search
CPC ..... H04L 1/08; H04L 1/1809; H04L 43/0829; H04L 1/1614; G09G 3/003; G09G 3/001;
(Continued)

(56) References Cited

U.S. PATENT DOCUMENTS 10,560,759 B1 2/2020 Liu et al.
11,166,072 B2 11/2021 He et al.
(Continued)

FOREIGN PATENT DOCUMENTS

CN 107995493 A 5/2018
KR 10-2008-0023066 A 3/2008
(Continued)

OTHER PUBLICATIONS

Tuan Thanh Le et al., Computing Offloading Over mmWave for Mobile VR, Make, 360 Video Streaming Alive, Oct. 29, 2018.
(Continued)

*Primary Examiner* — Shaheda A Abdin
(74) *Attorney, Agent, or Firm* — Jefferson IP Law, LLP

(57) ABSTRACT

A method of efficiently processing packet loss in an image display apparatus and the image display apparatus is provided. The method includes receiving an image divided into a plurality of segments, identifying a segment which a user is looking at, from among the plurality of segments, determining whether there is a loss in at least one data packet in the segment, which the user is looking at, from among the plurality of segments, and requesting to retransmit a lost data packet in the segment that the user is looking at, based on a result of the determining.

17 Claims, 15 Drawing Sheets

(51) Int. Cl.
*G09G 3/00* (2006.01)
*H04L 1/08* (2006.01)
*H04L 43/0829* (2022.01)

(52) U.S. Cl.
CPC ..... *H04L 43/0829* (2013.01); *G09G 2354/00* (2013.01); *G09G 2370/10* (2013.01)

(58) Field of Classification Search
CPC ........ G09G 5/12; G09G 5/14; G09G 2350/00; G09G 2370/10; G09G 2354/00; G06F 3/011; G02B 27/0172; G02B 27/0093; G02B 2027/0141
See application file for complete search history.

(56) References Cited

U.S. PATENT DOCUMENTS

| | | | |
|---|---|---|---|
| 11,281,539 B2 | 3/2022 | Miyazaki et al. | |
| 2003/0072269 A1* | 4/2003 | Teruhi | H04L 47/2408 370/252 |
| 2005/0271146 A1 | 12/2005 | Errico et al. | |
| 2006/0256785 A1* | 11/2006 | Nagai | H04L 1/1887 370/252 |
| 2006/0294125 A1* | 12/2006 | Deaven | H04N 19/12 375/E7.226 |
| 2007/0104369 A1* | 5/2007 | Weatherhead | H04H 60/59 382/173 |
| 2008/0043703 A1 | 2/2008 | Choi et al. | |
| 2013/0097309 A1 | 4/2013 | Ma et al. | |
| 2013/0263201 A1* | 10/2013 | Chung-How | H04N 21/84 725/116 |
| 2015/0085665 A1* | 3/2015 | Kompella | H04L 41/0893 370/236 |
| 2016/0093271 A1 | 3/2016 | Cho et al. | |
| 2017/0230130 A1 | 8/2017 | Grant et al. | |
| 2017/0285736 A1 | 10/2017 | Young et al. | |
| 2018/0033405 A1 | 2/2018 | Tall et al. | |
| 2018/0227090 A1 | 8/2018 | Lim et al. | |
| 2018/0359189 A1 | 12/2018 | Ye et al. | |
| 2019/0146883 A1 | 5/2019 | Miyazaki et al. | |

FOREIGN PATENT DOCUMENTS

| | | |
|---|---|---|
| WO | 2018/175855 A1 | 9/2018 |
| WO | 2019/005622 A1 | 1/2019 |
| WO | 2019/141901 A1 | 7/2019 |

OTHER PUBLICATIONS

International Search Report dated Jun. 29, 2021, issued in International Patent Application No. PCT/KR2021/003682.
Hosseini et al., Adaptive 360 VR Video Streaming Based on MPEG-DASH SRD, Dec. 2016.
Sreedhar et al., Viewport-Adaptive Encoding and Streaming of 360-Degree Video for Virtual Reality Applications (Abstract)—IEEE Conference Publication, Dec. 2016.
Corbillon et al., Viewport-adaptive navigable 360-degree video delivery, Sep. 26, 2016.
I. Bouazizi, Samsung Research America, SDP Descriptors for MMTP (=https://tools.ietf.org/html/draft-bouazizi-sdp-descriptors-mmtp-01), Mar. 21, 2016.
I. Bouazizi, Samsung Research America, MPEG Media Transport Protocol (MMTP) (=https://tools.ietf.org/id/draft-bouazizi-mmtp-01.html), Sep. 30, 2014.
Antoniou Pavlos et al: "Congestion control in wireless sensor networks based on bird flocking behavior", XP028527009 (Dec. 22, 2012).
Huawei Technologies Co Ltd: "Proposed VR QoE metrics", 3GPP-SA4 Ad-hoc meeting on Virtual Reality, Dec. 6-8, 2017, Santa Clara, CA, USA, XP051380791 (Dec. 4, 2017).
Extended European Search Report dated Dec. 2, 2022, issued in European Patent Application No. 21775695.6-1207.
European Office Action dated Sep. 10, 2024, issued in European Application No. 21775695.6.

\* cited by examiner

FIG. 7

The RTP header has the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ...                               |
+-+-+-+-+-+-+-+-+-+-+-+-+-+-+-+-+-+-+-+-+-+-+-+-+-+-+-+-+-+-+-+-+
```

FIG. 8A

PT [ Payload Number ] as Tile identifier m=video 8500 RTP/AVP 118 119 121
a=rtpmap : 118 H264 / 90000
a=angle 0 : 120 apt 118
a=rtpmap : 119 H264 / 90000
a=angle 120 : 240 apt 119
a=rtpmap : 121 H264 / 90000
a=angle 240 : 360 apt 121

Payload "118" will be used for data between angle "0 to 120"
Payload "119" will be used for data between angle "120 to 240"
Payload "121" will be used for data between angle "240 to 360"

FIG. 8B

| SSRC used as Tile identifier |
|---| m=video 8500 RTP/AVP 130
a=rtpmap : 130  H264 / 90000
a=ssrc : 1 angle 0 : 120
a=ssrc : 2 angle 120 : 240
a=ssrc : 3 angle 240 : 360

SSRC "1" will be used for data between angle "0 to 120"
SSRC "2" will be used for data between angle "120 to 240"
SSRC "3" will be used for data between angle "240 to 360"

IMAGE DISPLAY APPARATUS AND METHOD FOR MANAGING DATA PACKET LOSS

CROSS-REFERENCE TO RELATED APPLICATION(S)

This application is based on and claims priority under 35 U.S.C. § 119(a) of an Indian patent application number 202041013380, filed on Mar. 27, 2020, in the Indian Patent Office, and of a Korean patent application number 10-2020-0098116, filed on Aug. 5, 2020, in the Korean Intellectual Property Office, the disclosures of each of which is incorporated by reference herein in its entirety.

BACKGROUND

1. Field

The disclosure relates to multimedia data communication and transmission of communication data packets. More particularly, the disclosure relates to selective retransmission of data packets in a communication network.

2. Description of Related Art

With the development of image views and video views using a head mounted device (HMD), the experience of image views that are wider than the range of the line of sight of humans has increased. Such images or video contents can be referred to as panoramic content having a greater range than the viewing angle corresponding to the line of sight of humans during presentation of the content. When using an HMD, contents allowing viewing of 360 degree images, such as virtual reality (VR) content, are frequently provided. In this case, as the viewing angle of a general person is narrower than 120 degrees, about ⅔ of a 360 degree-content is in a range of a viewing angle, that the in general, a person cannot see. When a user watches a high-resolution 360-degree content or panoramic content, the network or image processing of an HMD used by a user may overload.

Thus, retransmitting data packets with respect to every loss of data packets existing only in a portion of an image that a user is not looking at hinders the efficient use of resources by the network or the HMD.

The above information is presented as background information only to assist with an understanding of the disclosure. No determination has been made, and no assertion is made, as to whether any of the above might be applicable as prior art with regard to the disclosure.

SUMMARY

There is a need to prevent network congestion and data overloading of an image display apparatus used by a user by controlling retransmission of data packets with respect to data packet loss occurring in a portion of an image that the user is not able to view in a content that is wider than a viewing angle that humans can see.

Aspects of the disclosure are to address at least the above-mentioned problems and/or disadvantages and to provide at least the advantages described below. Accordingly, an aspect of the disclosure is to provide a multimedia data communication and transmission of communication data packets for selective retransmission of data packets in a communication network.

Additional aspects will be set forth in part in the description which follows and, in part, will be apparent from the description, or may be learned by practice of the presented embodiments of the disclosure.

In accordance with an aspect of the disclosure, an image display apparatus is provided. The image display includes an input/output (I/O) interface, through which an image divided into a plurality of segments is received, a display configured to display the image divided into the plurality of segments, and a processor configured to identify a segment, which a user is looking at, among a plurality of segments, determine whether there is loss in at least one packet data in the segment, which the user is looking at, among the plurality of segments, and based on the determining that there is the loss in the at least one data packet in the segment, request to retransmit the lost at least one data packet in the segment that the user is looking at.

In accordance with another aspect of the disclosure, a method of managing image data packets, is provided. The method includes receiving an image divided into a plurality of segments, identifying a segment which a user is looking at, among the plurality of segments, determining whether there is loss in at least one data packet in the segment, which the user is looking at, among the plurality of segments, and based on the determining that there is the loss in the at least one data packet in the segment, requesting to retransmit the lost at least one data packet in the segment that the user is looking at.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a diagram illustrating a header structure when a Real-time Transport Protocol (RTP) is applied according to an embodiment of the disclosure;

FIG. 8A is a diagram illustrating an example of use of a payload type as a segment identifier according to an embodiment of the disclosure;

FIG. 8B is a diagram illustrating an example of use of a synchronization source identifier (SSRC) as a segment identifier according to an embodiment of the disclosure;

Throughout the drawings, like reference numerals will be understood to refer to like parts, components, and structures.

DETAILED DESCRIPTION

Figure 1:
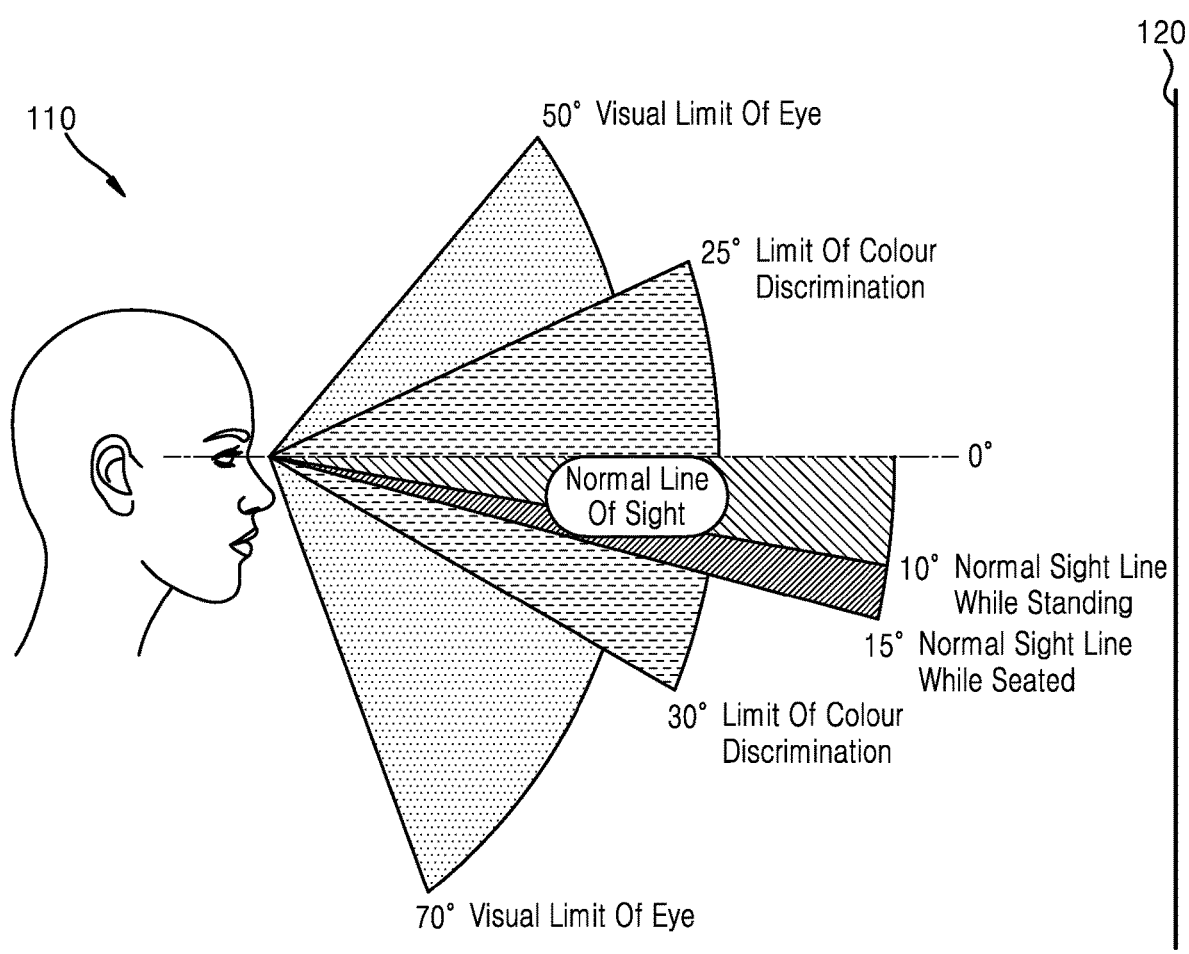
FIG. 1 is a diagram illustrating a viewing angle when viewing an image by using a head mounted device (HMD) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a portion "includes" an element, another element may be further included, rather than excluding the existence of the other element, unless otherwise described. In addition, terms such as " . . . unit", " . . . module", and the like refer to units that perform at least one function or operation, and the units may be implemented as hardware or software or as a combination of hardware and software.

Hereinafter, the disclosure will now be described more fully with reference to the accompanying drawings, in which various embodiments of the disclosure are shown such that one of ordinary skill in the art may easily work the disclosure. This disclosure may, however, be embodied in many different forms and should not be construed as limited to the embodiments of the disclosure set forth herein. In addition, elements not related to description are omitted in the drawings for clear description of the disclosure, and like reference numerals in the drawings denote like elements throughout the specification.

Throughout the disclosure, the expression "at least one of a, b or c" indicates only a, only b, only c, both a and b, both a and c, both b and c, all of a, b, and c, or variations thereof.

The functions according to the disclosure may be performed using a processor and a memory of a head mounted device (HMD). The processor may include one or more processors. The one or more processors may include a general-purpose processor such as a central processing unit (CPU), an application processor (AP), a digital signal processor (DSP), and the like, a processor dedicated to graphics, such as a graphics processing unit (GPU), a vision processing unit (VPU), or a processor dedicated to artificial intelligence, such as a neural processing unit (NPU). The one or more processors control processing of input data according to previously defined operating rules or models stored in a memory. Alternatively, when the one or more processors include a processor dedicated to artificial intelligence, the processor dedicated to artificial intelligence may be designed in a hardware structure specialized for processing of a certain artificial intelligence model.

Head-mounted devices (or head-mounted displays, HMDs) project the full view of an image to a user, even though the user is not able to gaze at (view) the whole range at the same time. It is generally known that the visual field of the human eye is less than 120 degrees. Therefore, loss of data packets that exist in a portion of an image (including video) that a user is not gazing at does not affect the user's viewing experience.

At the current level of application protocols (e.g., Real-time Transport Protocol (RTP) or MPEG Media Transport Protocol (MMTP)), there is currently no method available to distinguish a viewing area that a user is currently viewing, from a non-viewing area. Accordingly, even when a user is not viewing a portion of an image, client devices, including HMDs, request retransmission of all lost data packets in the non-viewing area that the user is not viewing. This leads to an unnecessary increase in network transmission bandwidth requirements. In addition, due to the retransmission of unnecessary data packets, power consumption and delay between endpoints of a network may increase. Waste of resources and the increased load in a network and a client device may even impair the quality of an image that a user is currently viewing.

FIG. 1 is a diagram illustrating a viewing angle when viewing an image by using an HMD according to an embodiment of the disclosure.

Referring to FIG. 1, when a user 110 of the HMD is looking at an image 120 projected through the HMD, a viewing angle of the user 110 is typically restricted to 120 degrees or less. When the user is standing, the user's line of sight is typically at an angle of only about 10 degrees with respect to the normal line of sight, and when the user is sitting, the line of sight of the user is at an angle of about 15 degrees with respect to the normal line of sight. A range of view within which a user is able to distinguish colors is about 60 degrees or less. A maximum viewing angle at which an image is recognizable is only 120 degrees.

Accordingly, when image content projected to the HMD is 360 degree-image content or image content having a viewing angle greater than 120 degrees, the user cannot view the whole image, but there is always an image area that the user cannot see.

Figure 2:
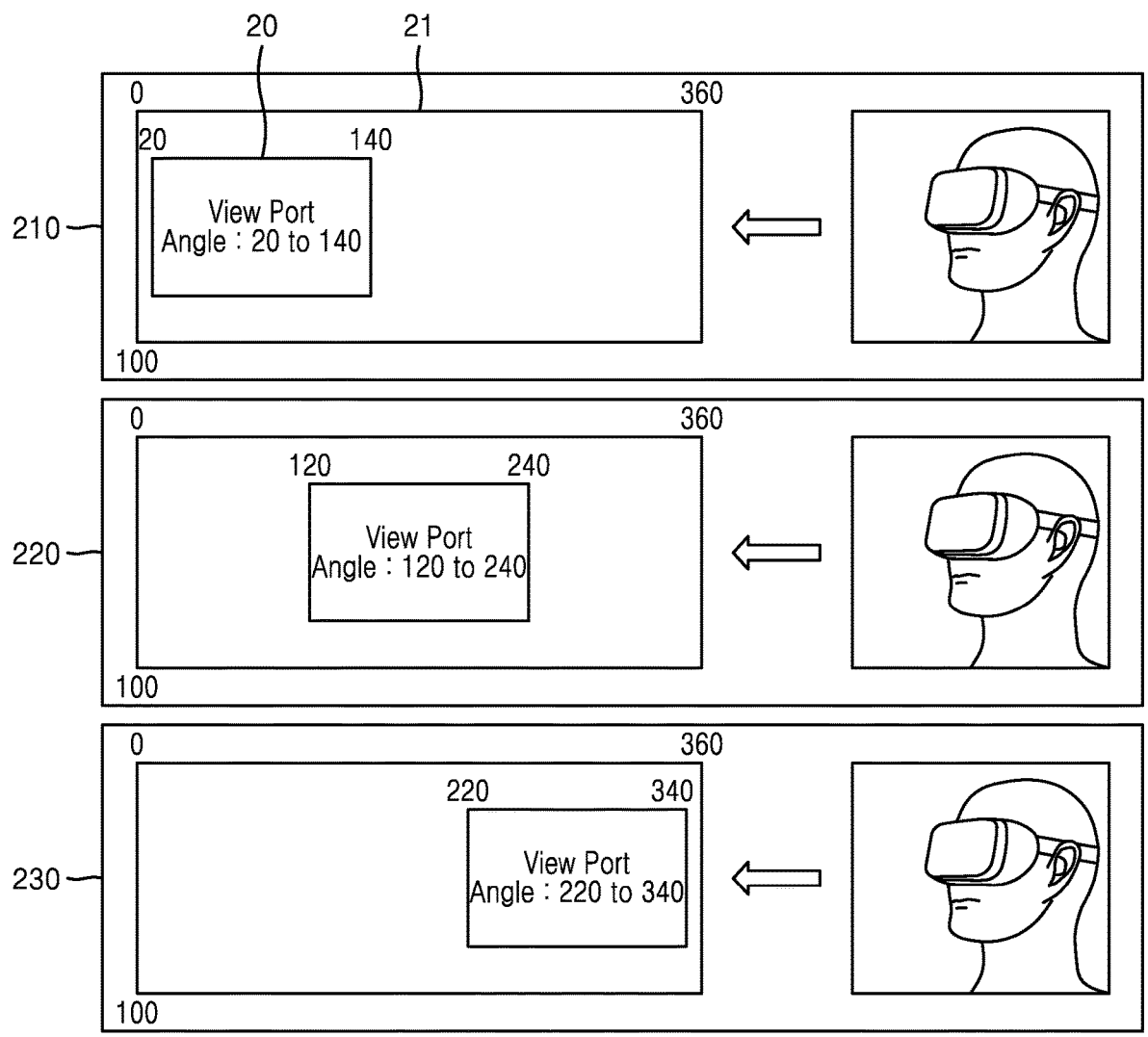
FIG. 2 is a diagram illustrating a relationship between an image and a viewport when gazing at the image by using an HMD according to an embodiment of the disclosure.

FIG. 2 is a diagram illustrating a relationship between an image and a viewport when staring at the image by using an HMD according to an embodiment of the disclosure.

Referring to FIG. 2, a viewport 20 representing an area that a user is looking at does not cover the entire 360-degree image 21 but an area corresponding to about 120 degrees.

In panel 210, the user is looking at an area corresponding to about 20 degrees to about 140 degrees out of an area of the 360-degree image 21 from 0 degrees to 360 degrees. Thus, image areas corresponding to 0 degrees to 20 degrees and 140 degrees to 360 degrees in panel 210 are not viewed by the user.

In panel 220, the user is looking at an area corresponding to about 120 degrees to about 240 degrees out of the area of the 360-degree image 21 from 0 degrees to 360 degrees. Thus, image areas corresponding to 0 degrees to 120 degrees and 240 degrees to 360 degrees in panel 220 are not viewed by the user.

In panel 230, the user is looking at an area corresponding to about 220 degrees to about 340 degrees out of the area of the 360-degree image 21 from 0 degrees to 360 degrees. Thus, image areas corresponding to 0 degrees to 220 degrees and 340 degrees to 360 degrees in panel 230 are not viewed by the user.

When an area that the user is not looking at is determined according to the above examples, even when data packet loss occurs in that area, a client device does not have to request retransmission of lost data packets.

There are various methods to determine a position of the viewport 20 of the user in a panoramic image or a 360-degree image. According to an embodiment of the disclosure, the viewport 20 of the user may be determined using an eye-tracking camera tracking the line of sight of the user. The viewport 20 is typically rectangular. In an embodiment of the disclosure, a client device (e.g., an HMD) may track the line of sight of a user by using an eye-tracking camera, and when a focus on an image is determined, the client device may determine, based on the focus, the viewport 20 having a rectangular shape with a certain width and height.

While the viewport 20 is moving in a horizontal direction and a horizontal area that the user is not looking at within the 360-degree image 21 is determined, in the embodiment of the disclosure of FIG. 2, the disclosure is not limited thereto. That is, when a vertical length of an image that a user is looking at is long, the client device may determine a vertical length that is not covered by the viewport 20. For example, when an image height is determined to be 0 to 100 as in FIG. 2, and a vertical viewport of the user is 30, the remaining length of 70 does not overlap the viewport. Accordingly, the client device according to an embodiment of the disclosure needs not consider data packet loss regarding the area corresponding to the length of 70, which the user is not looking at.

Figure 3:
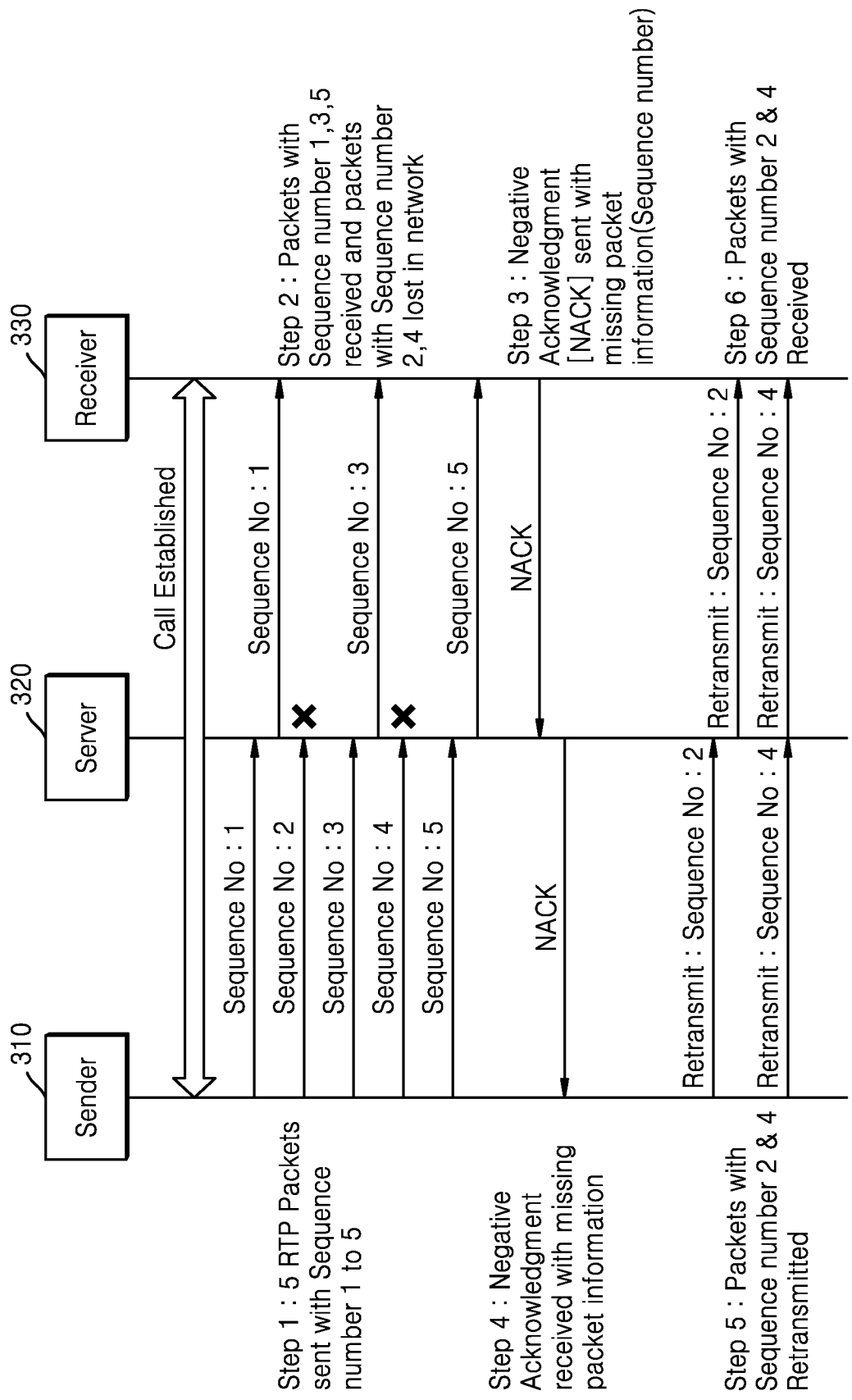
FIG. 3 is a diagram illustrating a retransmission of data packets performed as packet loss occurs during a data packet transmission via a network according to an embodiment of the disclosure.

FIG. 3 is a diagram illustrating a retransmission of data packets performed as packet loss occurs during a data packet transmission via a network according to an embodiment of the disclosure.

Referring to FIG. 3, a sender 310 transmits a data packet to a receiver 330 via a server 320. However, according to an embodiment of the disclosure, the sender 310 may also send a data packet directly to the receiver 330 without the data packet passing through the server 320.

When a connection between the sender 310 and the receiver 330 is initially established, in operation 1, the sender 310 transmits a data packet through a communication protocol such as RTP. Each data packet may be assigned with a sequence number of 1, 2, 3, 4, or 5, and the data packets may be identified from each other based on the sequence number. As a communication protocol, without being limited to RTP, any type of communication protocols for retransmitting lost data packets may be used.

In operation 2, the receiver 330 may recognize that data packets identified by the sequence numbers 1, 3, and 5 are received from among the data packets but data packets identified by the sequence numbers 2 and 4 are lost.

Representative factors that cause data packet loss are Layer 2 (L2) error and network congestion. Data packet loss is detected using a reliable protocol such as the Transmission Control Protocol (TCP), and a network manager may use status information or a certain tool to detect such packet loss and diagnose the same.

In an embodiment of the disclosure, the above-described sequence number to identify lost packets may be used as a data packet identifier.

Referring back to FIG. 3, in operation 3, the receiver 330 transmits, to the sender 310 via the server 320, packet information indicating that loss of the data packets identified by the sequence numbers 2 and 4 among the data packets and a non-acknowledgement (NACK) message. In an embodiment of the disclosure, the packet information may include the sequence numbers 2 and 4 identifying the lost data packets and a request for retransmission of the data packets corresponding to the sequence numbers 2 and 4.

In operation 4, the sender 310 receives the NACK message and the packet information transmitted by the receiver 330.

In operation 5, the sender 310 retransmits, to the receiver 330 via the server 320, the data packets corresponding to the sequence numbers 2 and 4 identified through the packet information.

According to the TCP, whether byte-size data is properly received may be checked using a sequence number identifying the number of bytes received from an end point, which may typically be one of the sender 310, the receiver 330, a client, or the server 320. Every time a payload byte is transmitted, the sequence number increases.

The TCP basically uses a cumulative acknowledgement scheme, and here, a receiver sends to a sender acknowledgement (ACK) indicating that all data before the acknowledged sequence number are received. The sender sets a sequence number field to a sequence number of a first payload byte in a data field of a segment, and the receiver sends acknowledgement designating a sequence number of a next byte to be received. For example, when the sender sends to the receiver a packet including four payload bytes with the sequence number of 150, the sequence numbers of the four payload bytes are 150, 151, 152, and 153. When this packet arrives at the receiver, the reception identification number of 154 is the sequence number of a next byte that is expected to be received in a next packet, and thus, the receiver sends the reception identification number of 154 to the sender.

Examples of the communication protocol for retransmitting lost data packets as shown in FIG. 3 are not limited to the TCP, and may also include RTP, MMTP or the like. However, neither of the TCP, the RTP, and the MMTP uses a method of selectively transmitting a data packet by determining an area that a user is not looking at.

Figure 4:
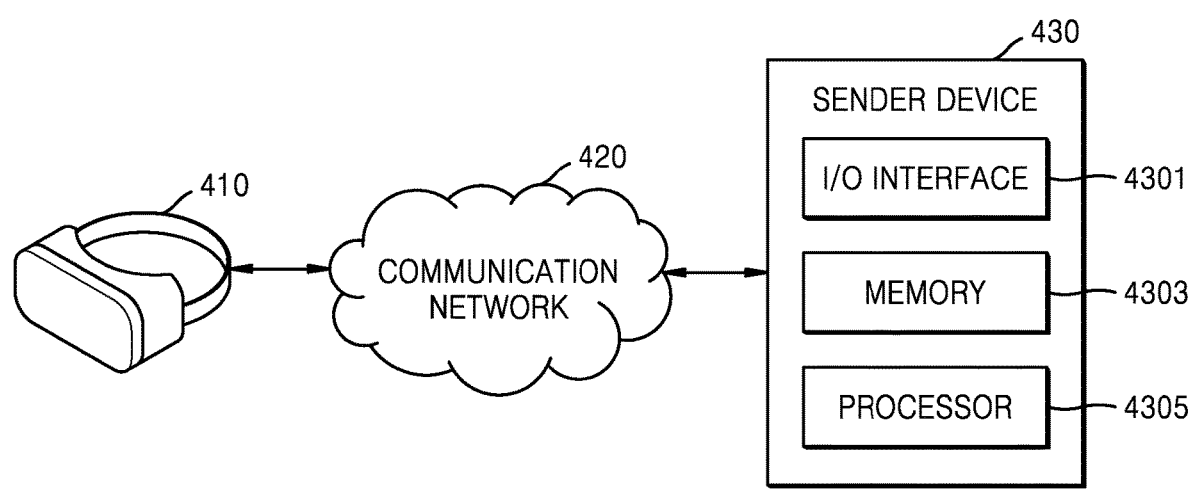
FIG. 4 is a diagram illustrating connection between a sender and a receiver, the connection being established via a network according to an embodiment of the disclosure.

FIG. 4 is a diagram illustrating connection between a sender and a receiver, the connection being established via a network according to an embodiment of the disclosure.

Referring to FIG. 4, an HMD 410, which is a client device and also a data packet receiver device, is connected to a sender device 430 transmitting a data packet, via a communication network 420.

According to an embodiment of the disclosure, the sender device 430 includes an input/output (I/O) interface 4301, a memory 4303 storing transmitted or received messages and data packets, and a processor 4305 controlling transmission and reception of data packets and input and output via the I/O interface 4301.

Although not illustrated, the sender device 430 may further include a display displaying images. The communication network 420 may include a server (not shown) connecting the HMD 410, which is a receiver device, to the sender device 430.

Figure 5:
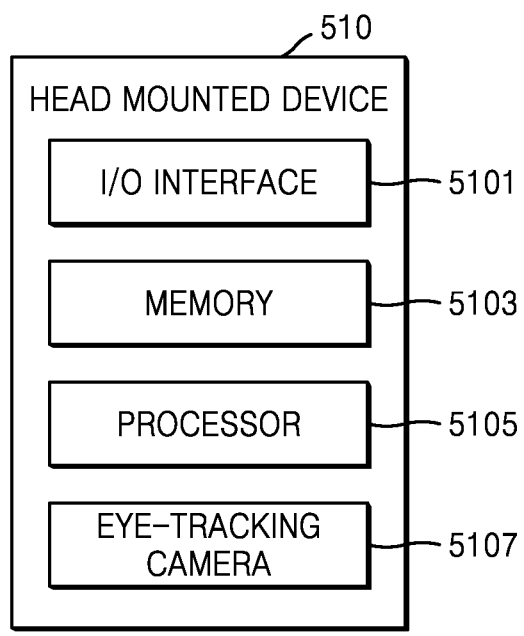
FIG. 5 is a block diagram of an HMD according to an embodiment of the disclosure.

FIG. 5 is a block diagram of an HMD as a receiver device according to an embodiment of the disclosure.

Referring to FIG. 5, a block diagram of an HMD 510 as a receiver device receiving a data packet corresponding to image or video data, according to an embodiment of the disclosure, is illustrated.

The HMD 510 includes an I/O interface 5101, a memory 5103 storing transmitted and received messages and data packets, and a processor 5105 controlling transmission and reception of data packets and input and output via the I/O interface 5101. In addition, according to an embodiment of the disclosure, an eye-tracking camera 5107 to track a location which a user is looking at on an image may be included.

Figure 6A:
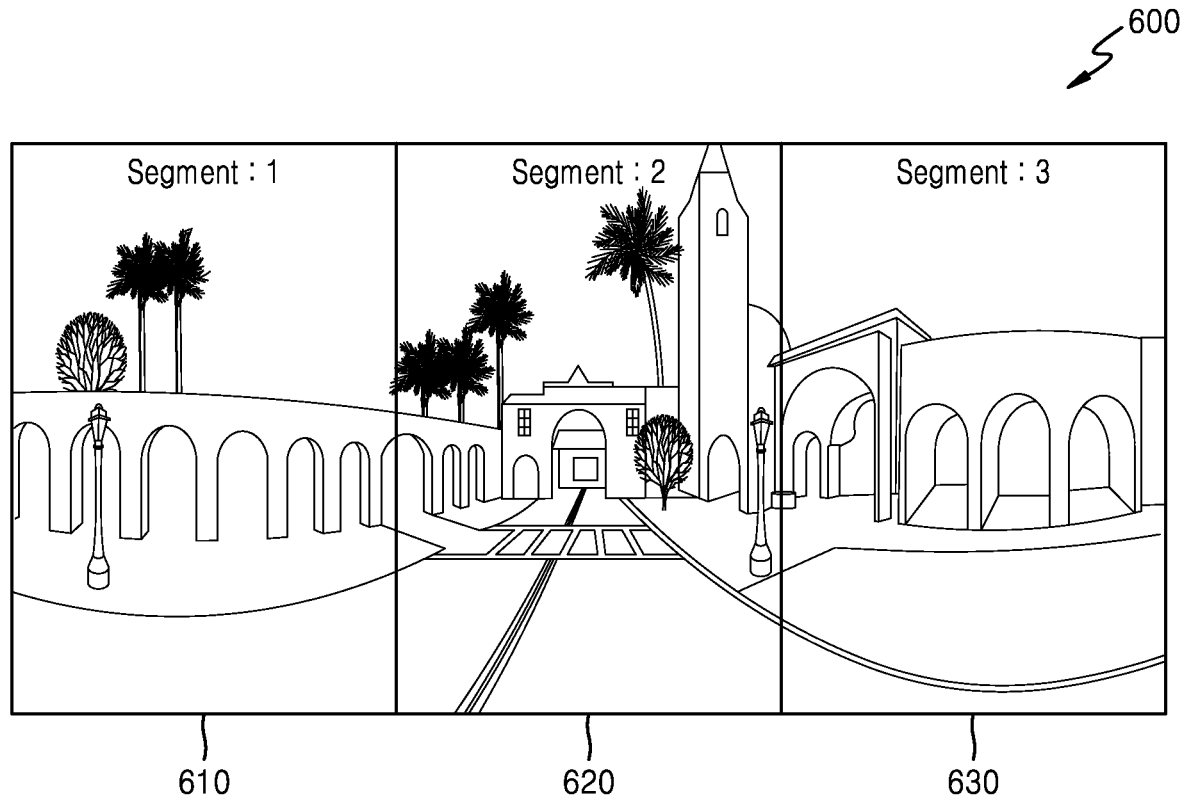
FIG. 6A is a diagram illustrating division of an image into a plurality of segments according to an embodiment of the disclosure.

FIG. 6A is a diagram illustrating division of an image into a plurality of segments according to an embodiment of the disclosure.

Referring to FIG. 6A, an image 600 may be divided into three segments 610, 620, and 630, according to an embodiment of the disclosure. The three segments acquired through the division are referred to as a first segment 610, a second segment 620, and a third segment 630, respectively. For convenience of description, a segment in the specification may also be alternatively referred to as an image segment, an image tile, or a tile. An image throughout the specification includes a static image and a moving image (video). The number of segments acquired through division and each segment identifier information are shared between a sender and a receiver before transmission and reception of data packets is initiated.

For a 360-degree image, a viewing angle of a user is about 120 degrees, and thus, it is appropriate to divide the 360-degree image into three segments. However, the disclosure is not limited thereto, and the number of segments to divide into may vary according to situations. That is, the image 600 may be divided into two, four, five or six segments according to the processing capability of a processor or other various conditions.

When a viewport of a user is on the first segment 610, the user is not looking at the second segment 620 and the third segment 630, and thus, despite data packet loss occurred on any portion of images corresponding to the second segment 620 and the third segment 630, a client device (e.g., the HMD 510) needs not request the server 320 or the sender 310 to retransmit the lost data packets.

On the other hand, when a viewport of a user is on the first segment 610 and data packet loss occurs in any portion of an image corresponding to the first segment 610, this loss affects the image viewing experience of the user and the client device needs to request the server 320 or the sender 310 to retransmit the lost data packet.

According to an embodiment of the disclosure, when the processor 5105 of the HMD 510 identifies a segment that the user is looking at, among a plurality of segments on the image 600, the processor 5105 first determines a viewport at which the user is looking, and determines a segment to which the determined viewport belongs, among the plurality of segments.

A method of determining a location of a viewport according to an embodiment of the disclosure is as follows.

The processor 5105 may determine the viewport based on a viewing angle of a user's gaze, a gaze direction of the user, and segment identifiers respectively allocated to the plurality of segments. However, the method of determining a location of a viewport, by the processor 5105, is not limited thereto, and a location of a viewport on the image 600 may be determined using various methods.

According to an embodiment of the disclosure, a location of a viewport may be determined using a focus sensor of the user, installed in the HMD 510. According to another embodiment of the disclosure, a location of a viewport may be determined using the eye-tracking camera 5107 of the user, installed in the HMD 510. That is, the eye-tracking camera of the user may measure a gaze point and the HMD 510 may determine which part of the image the user is looking at. When the gaze point is determined, the HMD 510 may virtually form a viewport rectangle in consideration of upper and lower viewing angles with respect to the gaze point as a center point.

Various methods may be used to divide an image into a plurality of segment, which will now be described below.

Figure 6B:
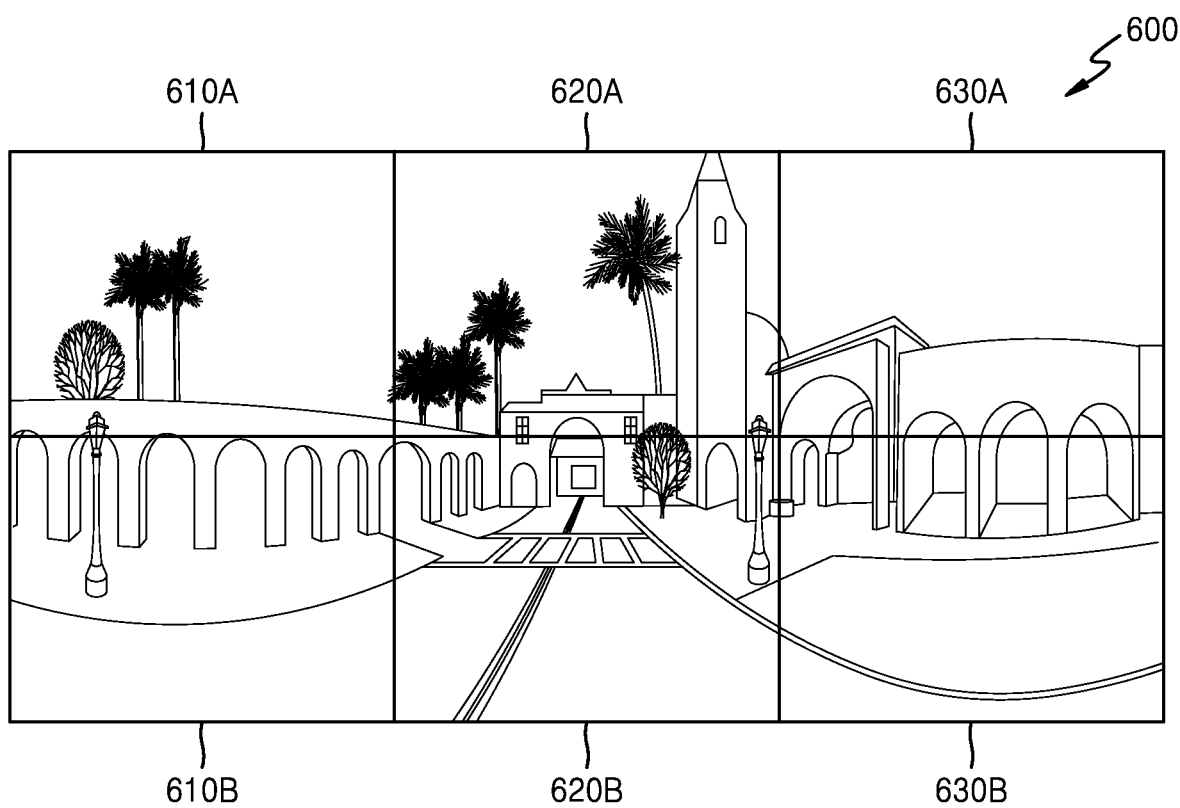
FIG. 6B is a diagram illustrating division of an image into a plurality of segments according to another embodiment of the disclosure.

FIG. 6B is a diagram illustrating division of an image into a plurality of segments according to another embodiment of the disclosure.

Referring to FIG. 6B, similarly to FIG. 6A, the image 600 is divided into three segments 610A, 610B; 620A, 620B and 630A, 630B in a horizontal direction with respect to a user's view, but also into two segments (e.g., 610A; 610B) in a vertical direction. Thus, the number of segments acquired through the division according to FIG. 6B is six in total.

Like FIG. 6A, when a viewport of the user is within 0 degrees to about 120 degrees in the image 600, the HMD 510 does not consider data packet loss with respect to the segments 620A, 620B, 630A, and 630B.

When the viewport of the user is limited only to the segment 610B and the user is not looking at the segment 610A, the HMD 510 does neither consider data packet loss occurring in an image corresponding to the segment 610A. Before receiving a data packet, the HMD 510 shares in advance with a data packet sender identifiers of all segments acquired through the division.

Figure 6C:
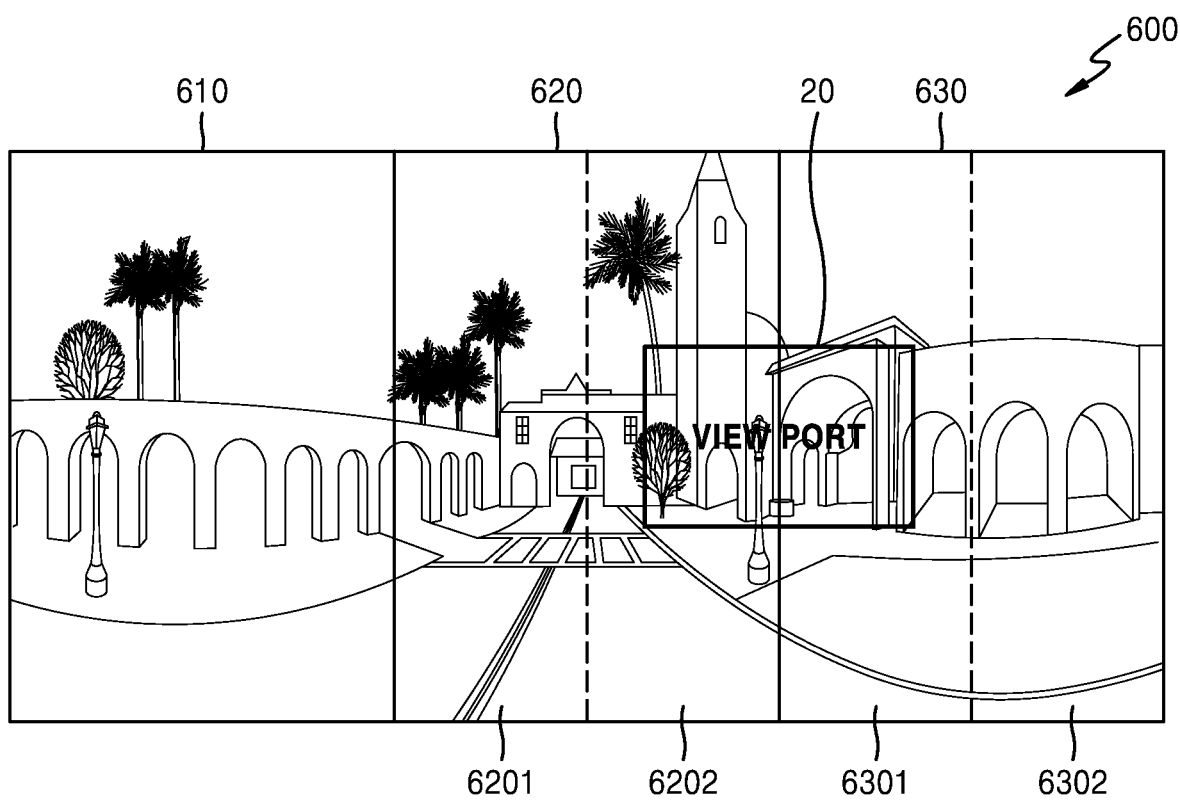
FIG. 6C is a diagram illustrating an example of dividing a segment into sub-segments and selectively sending a retransmission request regarding packet loss according to an embodiment of the disclosure.

FIG. 6C is a diagram illustrating an example of dividing a segment into sub-segments and selectively sending a retransmission request regarding packet loss according to an embodiment of the disclosure.

Referring to FIG. 6C, a viewport 20 of a user is over the second segment 620 and the third segment 630. In this case, as the user's line of sight is not detected from the first segment 610, the HMD 510 will not request retransmission regarding data packet loss with respect to the first segment 610.

However, as the viewport 20 of the user is over the second segment 620 and the third segment 630, unlike FIG. 6A, resource consumption may increase because the HMD 510 has to request retransmission regarding data packet loss with respect to the two segments in the embodiment of the disclosure of FIG. 6C.

Accordingly, in this case, when a viewport, the location of which is determined on the image 600, belongs to two or more segments, the processor 5105 of the HMD 510 divides the segments, to which the viewport belongs, one more time. That is, the second and third segments 620 and 630, over which the viewport stretches, are further divided into a plurality of sub-segments 6201, 6202; 6301, 6302. The processor 5105 identifies the sub-segments 6202 and 6301, to which the viewport 20 belongs, among the plurality of sub-segments. Then the processor 5105 shares, with a sender, the number of identified sub-segments and identifiers of the sub-segments. When determining loss in at least one data packet in a segment which a user is looking at, among a plurality of segments, the processor 5105 may determine whether there is loss in at least one data packet in a sub-segment identified as above and may request retransmission of the lost data packet in the sub-segment that the user is looking at, based on the determination. When requesting retransmission of the lost data packet according to an embodiment of the disclosure, an identifier of the lost data packet may be transmitted together.

Figure 6D:
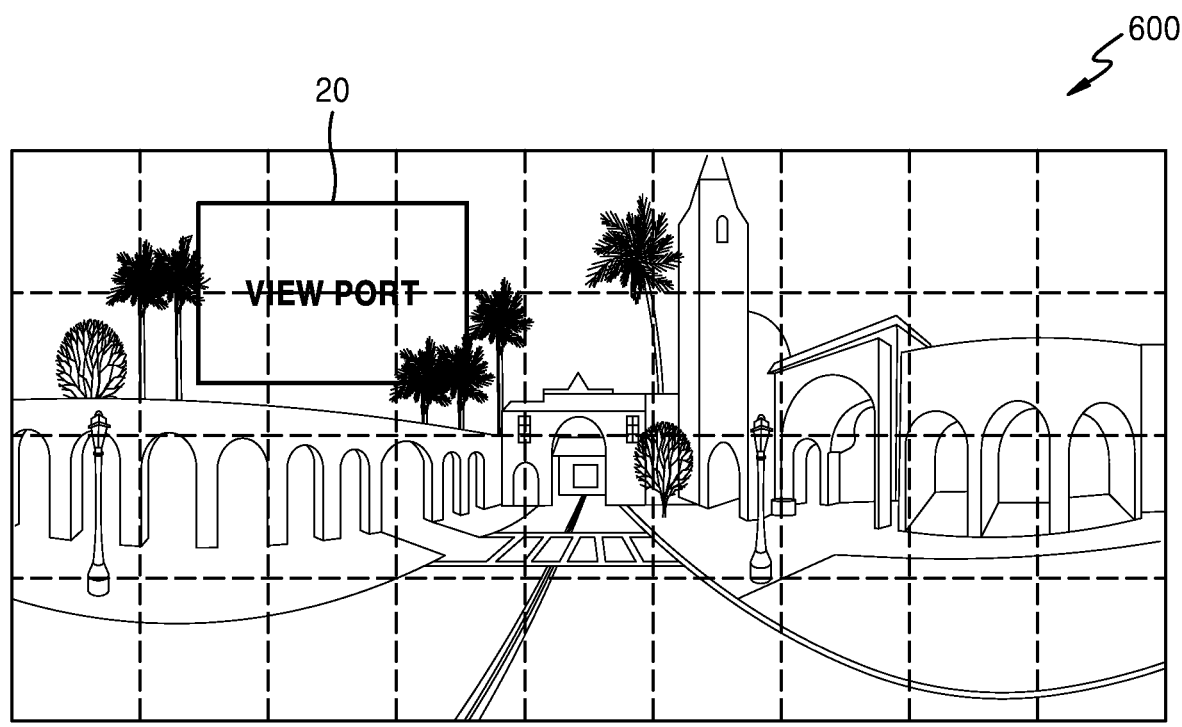
FIG. 6D is a diagram illustrating an example of dividing an image into a large number of segments according to an embodiment of the disclosure.

While FIG. 6C illustrates an example of dividing a segment into sub-segments in a horizontal direction, an embodiment in which a segment is further divided into sub-segments in a vertical direction will be applied in the same manner as shown in FIG. 6D.

In regard to the embodiment of the disclosure of FIG. 6C, as processing of dividing sub-segments according to a motion of a viewport may consume large resources of the processor 5105, dividing an image into a large number of segments from the start may also be considered.

FIG. 6D is a diagram illustrating an example of dividing an image into a large number of segments according to an embodiment of the disclosure.

Referring to FIG. 6D, the image 600 is divided into nine segments in a horizontal direction and into four segments in a vertical direction, thus into a total of 36 segments. According to an embodiment of the disclosure, the number of segments acquired through division and each of segment identifiers thereof may be shared with a sender in advance. The processor 5105 only has to determine a real-time location of the viewport 20 when the viewport 20 is moving and a segment which is obtained through the division and in which the viewport 20 is located, and to process only data packet loss in the segment where the viewport 20 is located.

According to an embodiment of the disclosure, during initial data transmission, the sender 310 and the receiver 330 may determine in advance the number of a plurality of segments and segment identifier/sub-segment identifier allocated to each segment, and share the number of segments and information of the segment identifier/sub-segment identifier allocated to each segment. All segments/sub-segments in the image 600 may be independently and separately decoded at an end of the receiver 330.

FIG. 7 is a diagram illustrating a header structure when an RTP is applied according to an embodiment of the disclosure.

Referring to FIG. 7, the RTP is used in transmitting a plurality of segments as described above. In an embodiment of the disclosure, a segment identifier associated with each segment may include a predefined number. In addition, a segment identifier may include viewing angle information of a user and thus constitute segment information. As the predefined number corresponding to the segment identifier, a payload type (PT), a synchronization source identifier (SSRC), and/or a data packet identifier may be used in a data packet. According to an embodiment of the disclosure, a receiver may transmit, to a sender, repeated segment identifiers—PT and S SRC—with respect to one segment to thereby perform cross-checking between two end points.

According to an embodiment of the disclosure, a sequence number included in a header may be used as a data packet identifier identifying a data packet.

A header according to FIG. 7 is merely an embodiment of the disclosure regarding application of the RTP, and also when other protocols are applied, a header may include both a segment identifier and an identifier of a lost data packet to be described with reference to FIG. 9A.

FIG. 8A is a diagram illustrating an example of use of a payload type as a segment identifier according to an embodiment of the disclosure.

Referring to FIG. 8A, when using the segment division according to FIG. 6A, segment identifiers may be used as follows: PT (apt)=118 is used for the first segment 610, PT (apt)=119 is used for the second segment 620, and PT (apt)=121 is used for the third segment 630. A PT is replaced by a payload number in FIG. 8A.

FIG. 8B is a diagram illustrating an example of use of a synchronization source identifier (SSRC) as a segment identifier according to an embodiment of the disclosure.

Referring to FIG. 8B, when using the segment division according to FIG. 6A, segment identifiers may be used as follows: SSRC=1 (ssrc:1) is used for the first segment 610, SSRC=2 (ssrc:2) is used for the second segment 620, and SSRC=3 (ssrc:3) is used for the third segment 630.

Figure 9A:
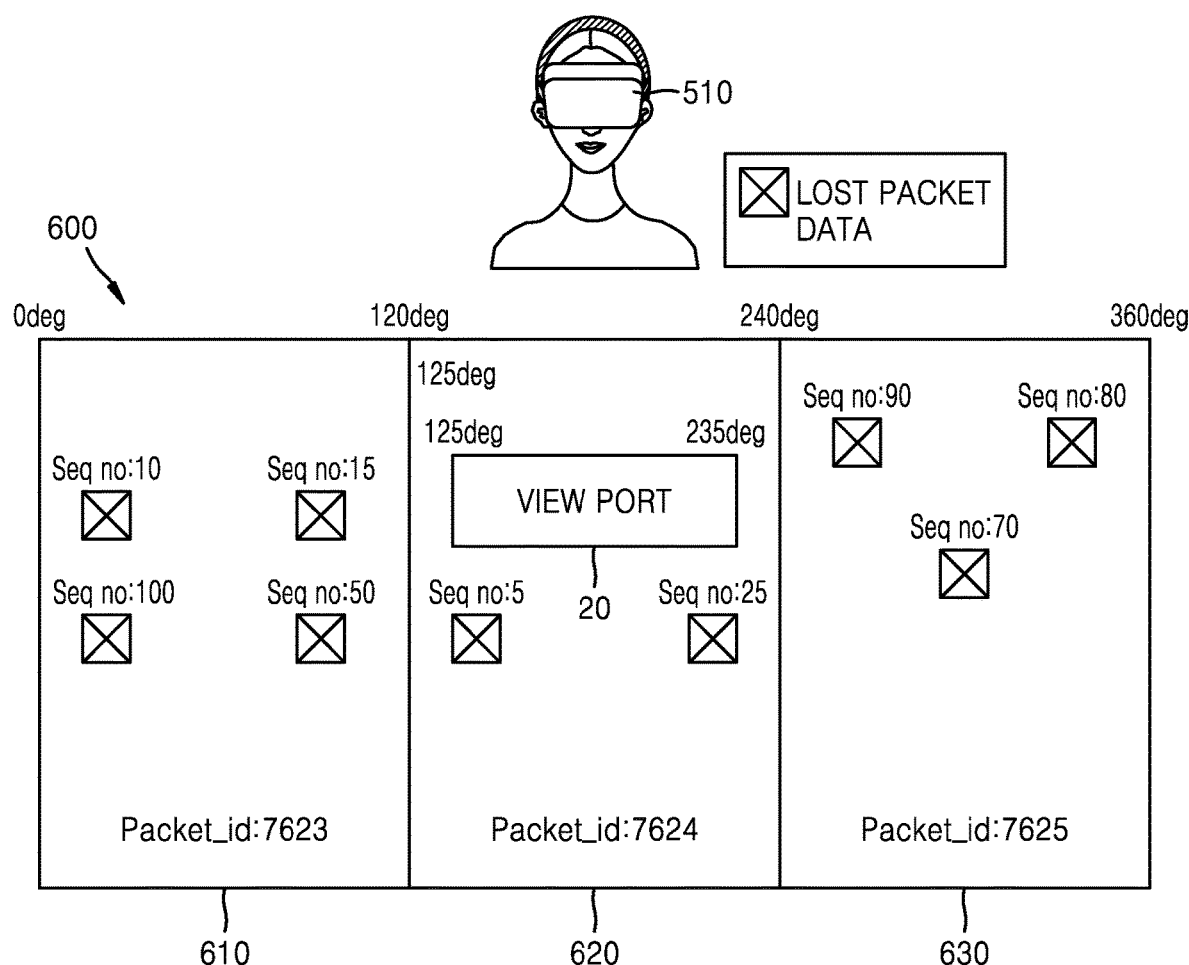
FIG. 9A is a diagram illustrating an example of a data packet loss in an image according to an embodiment of the disclosure.

FIG. 9A is a diagram illustrating an example of a data packet loss in an image according to an embodiment of the disclosure.

The image 600 is divided into three segments according to FIG. 6A.

Referring to FIG. 9A, a data packet identifier of 7623 is allocated to the first segment 610, a data packet identifier of 7624 is allocated to the second segment 620, and a data packet identifier of 7625 is allocated to the third segment 630. That is, according to an embodiment of the disclosure, a data packet identifier may be used as a segment identifier.

In the first segment 610, loss of four data packets has occurred. The lost data packets may be identified based on the sequence number in the header according to FIG. 7. That is, loss of data packets corresponding to sequence numbers of 10, 15, 100, and 50 occurred. However, the lost data packets corresponding to the sequence numbers of 10, 15, 100, and 50 are not where the viewport 20 of the user is located, and thus, the HMD 510 does not request the sender 310 to retransmit the lost data packets corresponding to the sequence numbers of 10, 15, 100, and 50.

Likewise, in the third segment 630, loss of three data packets has occurred. However, as the third segment 630 is not where the viewport 20 is located, a request to retransmit lost data packets corresponding to sequence numbers of 70, 80, and 90 is not transmitted to the sender 310.

On the other hand, in the second segment 620, data packets corresponding to sequence numbers of 5 and 25 are lost. The second segment 620 is where the viewport 20 is located, and thus, the HMD 510 requests the sender 310 to retransmit the lost data packets. According to an embodiment of the disclosure, when requesting retransmission of a lost data packet, a sequence number which is an identifier of the lost data packet may be transmitted together. In an embodiment of the disclosure, when the HMD 510 requests retransmission of a lost data packet, the request may further include a segment identifier of a segment, to which the lost data packet belongs.

Figure 9B:
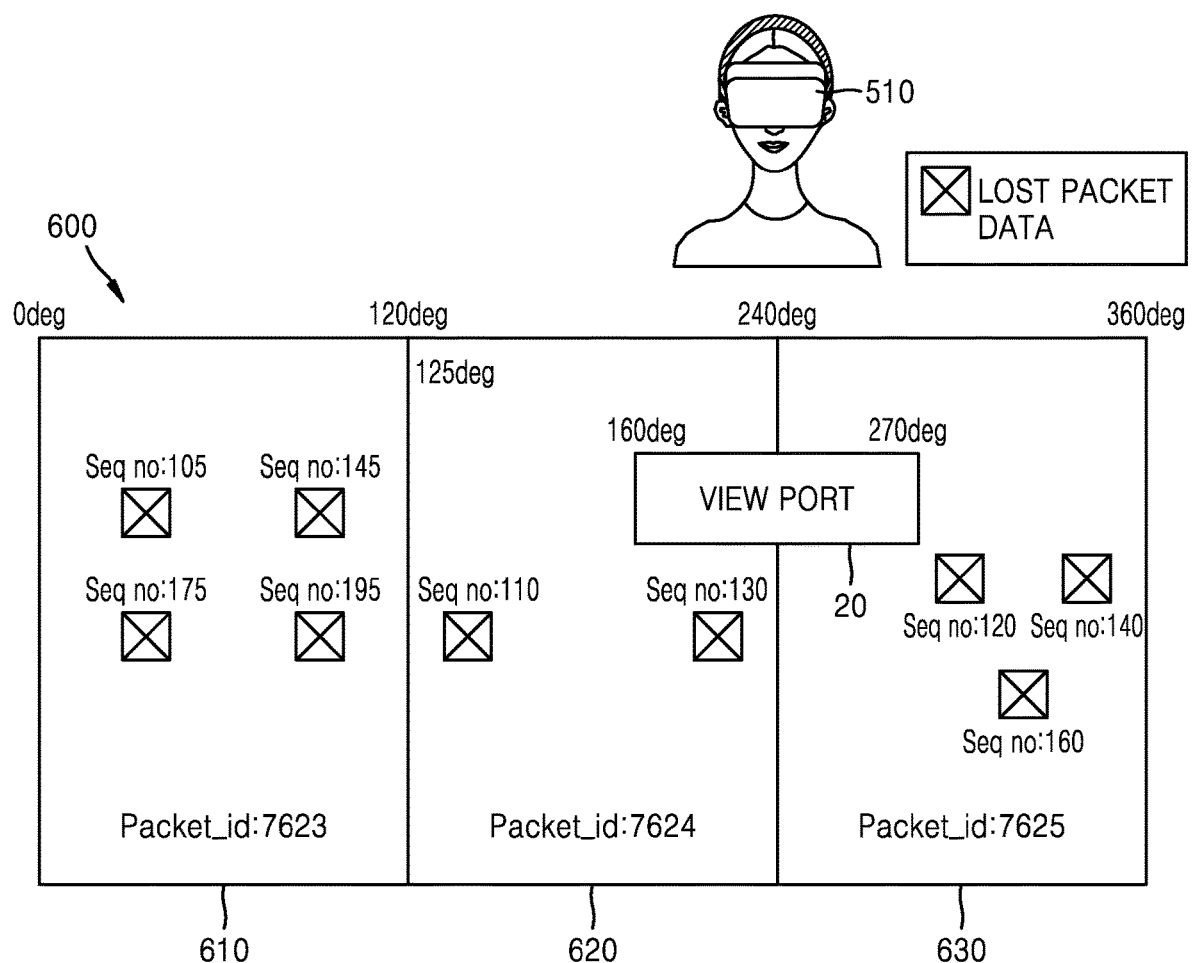
FIG. 9B is a diagram illustrating an example of a data packet loss in an image according to another embodiment of the disclosure.

FIG. 9B is a diagram illustrating an example of a data packet loss in an image according to another embodiment of the disclosure.

Referring to FIG. 9B, unlike FIG. 9A, the viewport 20 is located at a viewing angle between about 160 degrees and about 270 degrees.

330 may periodically receive the entire image that the user is looking at.

Table 1 shows comparison between a conventional case where retransmission of lost data packets is performed with respect to all areas of an image and a proposed case where retransmission of lost data packets is not performed for a non-viewport region.

TABLE 1

| Method | Bitrate | Original Number of Packets Transmitted/Sec | Packet Loss/Sec | Number of Lost Packets requested for retransmission/Sec | Number of Lost Packets retransmitted/Sec | Bandwidth = (Retransmitted packets * MTU * 8)/1000 | Bandwidth Saved |
|---|---|---|---|---|---|---|---|
| Conventional | 10 Mbps | 833 | 1% | 8 | 8 | 96 Kbps | |
| | | | 3% | 24 | 24 | 288 Kbps | |
| | | | 5% | 40 | 40 | 480 Kbps | |
| | | | 10% | 80 | 80 | 960 Kbps | |
| Proposed | 10 Mbps | 833 | 1% | 3 | 3 | 36 Kbps | 60 Kbps |
| | | | 3% | 8 | 8 | 96 Kbps | 192 Kbps |
| | | | 5% | 13 | 13 | 156 Kbps | 324 Kbps |
| | | | 10% | 27 | 27 | 324 Kbps | 636 Kbps |

Unlike FIG. 9A, in FIG. 9B, as the viewport 20 is located both in the second segment 620 and the third segment 630, a request for lost data packets is made with respect to lost data packets in the second segment 620 and the third segment 630.

Figure 10:
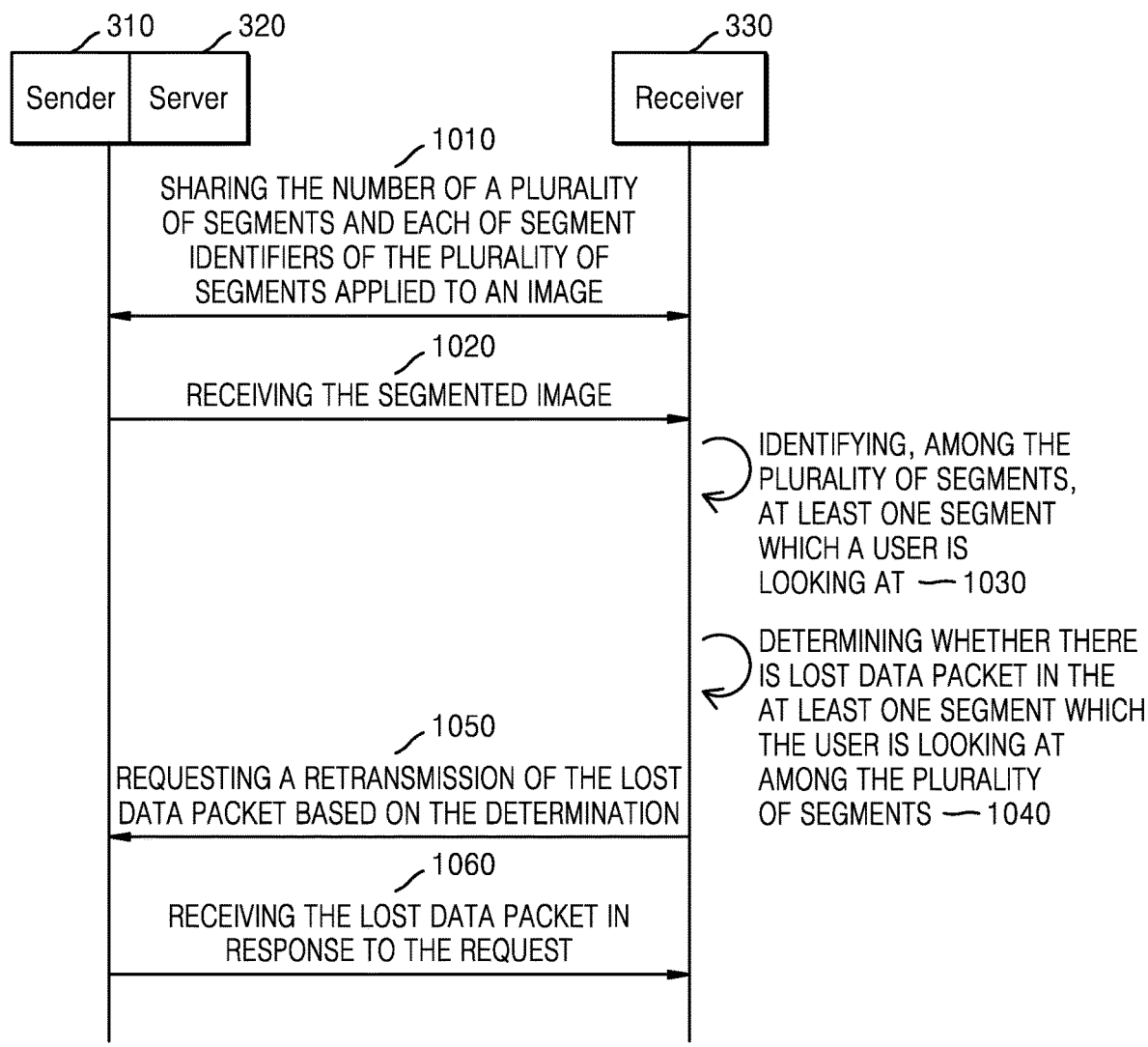
FIG. 10 is a sequence diagram of requesting retransmission of a lost data packet among a plurality of segments according to an embodiment of the disclosure.

FIG. 10 is a sequence diagram of requesting retransmission of a lost data packet among a plurality of segments according to an embodiment of the disclosure.

The receiver 330 is a client device and may be the HMD 510.

Referring to FIG. 10, the receiver 330 divides the image 600 into a plurality of segments and determines and detects an identifier of each of the plurality of segments.

In operation 1010, the receiver 330 and the sender 310 and/or the server 320 share the number of the plurality of segments and each of the identifiers of the segments with each other.

In operation 1020, the sender 310 transmits a data packet corresponding to the image 600 to the receiver 330.

In operation 1030, the receiver 330 determines a viewport that a user is currently looking at and a segment where the viewport is located. A processor of the receiver 330 determines the viewport that the user is gazing at, and identifies a segment to which the determined viewport belongs, among the plurality of segments, to thereby determine a segment where the viewport is located. The viewport may be determined based on a viewing angle of a gaze of the user, a gaze direction of the user, and/or segment identifiers respectively allocated to the plurality of segments.

In operation 1040, the receiver 330 determines whether there is a lost data packet in the segment that the user is looking at, that is, in the segment where the viewport is located.

In operation 1050, the receiver 330 requests the sender 310 and/or the server 320 to retransmit the data packet loss in the segment that the user is looking at, that is, the segment where the viewport is located. When requesting to retransmit the lost data packet according to an embodiment of the disclosure, the receiver 330 may also transmit an identifier of the lost data packet and/or an identifier of the segment to which the lost data packet belongs.

In operation 1060, the receiver 330 receives, from the sender 310, the lost data packet, for which retransmission is requested. In an embodiment of the disclosure, the receiver According to Table 1, by applying the method according to the disclosure, 60 kbps bandwidth may be saved when a packet loss rate from among the total data packets transmitted in an HMD is 1%, 192 kpbs bandwidth may be saved at a packet loss rate of 3%, 324 kpbs bandwidth may be saved at a packet loss rate of 5%, and 636 kbps bandwidth may be saved at a packet loss rate of 10%.

Embodiments of the disclosure may be implemented through at least one software program that is executed on at least one hardware device and performs a network management function to control elements of the hardware device.

The methods according to the embodiments of the disclosure may be embodied as program instructions executable by various computer means and may be recorded on a computer-readable recording medium. The computer readable recording medium may include program instructions, a data file, a data structure etc. alone or in combination. The program instructions written to the computer readable recording medium may be specifically designed and configured for the embodiments of the disclosure or may be well-known and available to one of ordinary skill in the art. Examples of the computer readable recording medium include non-transitory media such as magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program instructions (e.g., ROM, RAM, flash memories, etc.). Examples of the program instructions include advanced language codes that can be executed by a computer by using an interpreter or the like as well as machine language codes made by a compiler.

According to the image data packet managing method and the image display apparatus of to the disclosure, network congestion may be reduced and communication and processing resources for data management in an HMD may be reduced by managing loss of only data packets in a viewing angle of a user's gaze.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing image data packets, the method comprising:
receiving an image divided into a plurality of segments;
identifying a segment which a user is looking at, from among the plurality of segments;
determining whether at least one data packet is lost in the segment which the user is looking at; and
based on determining that the at least one data packet in the segment is lost, requesting to retransmit only the lost at least one data packet in the segment that the user is looking at, without requesting retransmission of lost data packets in segments that the user is not looking at,
wherein the identifying of the segment which the user is looking at, from among the plurality of segments, comprises:
determining a viewport at which the user is looking; and
identifying a segment to which the determined viewport belongs, from among the plurality of segments,
when the determined viewport belongs to two or more segments, further dividing each of the plurality of segments into a plurality of sub-segments; and
identifying a sub-segment to which the viewport belongs, from among the plurality of sub-segments,
wherein the determining of whether the at least one data packet is lost in the segment, which the user is looking at, comprises determining whether there is a loss in at least one data packet in the identified sub-segment, and
wherein, based on determining that the at least one data packet in the sub-segment is lost, the requesting to retransmit the lost at least one data packet in the segment which the user is looking at comprises requesting to retransmit the lost at least one data packet in the sub-segment, which the user is looking at.

2. The method of claim 1, further comprising sharing with a sender of the image a number of the plurality of segments and each of segment identifiers respectively allocated to the plurality of segments.

3. The method of claim 2, wherein the segment identifiers comprise at least one of a synchronization source identifier for synchronization between a sending device and a receiving device of the data packet, a payload type, or a packet identifier in a data header field.

4. The method of claim 1, further comprising receiving, in response to the requesting, a retransmitted data packet corresponding to the lost at least one data packet.

5. The method of claim 1, wherein the plurality of segments are independently decodable.

6. The method of claim 1, wherein the determining of the viewport comprises determining the viewport based on a viewing angle of a gaze of the user, a gaze direction of the user, and a segment identifier allocated to each of the plurality of segments.

7. The method of claim 1, wherein the requesting to retransmit the lost at least one data packet comprises transmitting a packet identifier of the lost at least one data packet.

8. The method of claim 7, wherein the requesting to retransmit the lost at least one data packet further comprises transmitting an identifier of a segment to which the lost at least one data packet belongs.

9. The method of claim 1, further comprising periodically receiving an entire image that the user is to look at.

10. An image display apparatus comprising:
an input/output (I/O) interface through which an image divided into a plurality of segments is received;
a display configured to display the image divided into the plurality of segments; and
a processor configured to:
identify a segment which a user is looking at, from among the plurality of segments,
determine whether at least one packet data is lost in the segment, which the user is looking at, and
based on determining that the at least one data packet is lost in the segment, request to retransmit only the lost at least one data packet in the segment that the user is looking at, without requesting retransmission of lost data packets in segments that the user is not looking at,
wherein the processor is further configured, when identifying, by the processor, of the segment which the user is looking at, to:
determine a viewport at which the user is looking; and
identify the segment to which the determined viewport belongs, from among the plurality of segments,
wherein the processor is further configured to:
when the determined viewport belongs to two or more segments, further divide each of the plurality of segments into a plurality of sub-segments; and
identifying a sub-segment to which the viewport belongs, from among the plurality of sub-segments,
wherein the determining of whether the at least one data packet is lost in the segment, which the user is looking at, comprises determining whether there is a loss in at least one data packet in the identified sub-segment, and
wherein, based on determining that the at least one data packet in the sub-segment is lost, the requesting to retransmit the lost at least one data packet in the segment which the user is looking at comprises requesting to retransmit the lost at least one data packet in the sub-segment, which the user is looking at.

11. The image display apparatus of claim 10, wherein the I/O interface is configured to share with a sender sending the image, a number of the plurality of segments and each of segment identifiers respectively allocated to the plurality of segments.

12. The image display apparatus of claim 10, wherein the I/O interface is configured to receive, in response to the requesting by the processor, a retransmitted data packet corresponding to the lost at least one data packet.

13. The image display apparatus of claim 10, wherein the image display apparatus comprises a head mounted device.

14. A non-transitory computer readable medium having recorded thereon a program, which when executed by at least one processor, performs a method of managing image data packets, the method comprising:
receiving an image divided into a plurality of segments;
identifying a segment, which a user is looking at, from among the plurality of segments;
determining whether at least one data packet is lost in the segment, which the user is looking at; and
based on determining that the at least one data packet is lost in the segment, requesting to retransmit only the lost at least one data packet in the segment, which the user is looking at, without requesting retransmission of lost data packets in segments that the user is not looking at,
wherein the identifying of the segment which the user is looking at, from among the plurality of segments, comprises:
determining a viewport at which the user is looking; and identifying a segment to which the determined viewport belongs, from among the plurality of segments, when the determined viewport belongs to two or more segments, further dividing each of the plurality of segments into a plurality of sub-segments; and identifying a sub-segment to which the viewport belongs, from among the plurality of sub-segments, wherein the determining of whether the at least one data packet is lost in the segment, which the user is looking at, comprises determining whether there is a loss in at least one data packet in the identified sub-segment, and wherein, based on determining that the at least one data packet in the sub-segment is lost, the requesting to retransmit the lost at least one data packet in the segment which the user is looking at comprises requesting to retransmit the lost at least one data packet in the sub-segment, which the user is looking at.

15. The non-transitory computer readable medium of claim 14, wherein, when the lost at least one data packet is greater than one packet, the request to retransmit the lost at least one data packet in the segment comprises an identifier for each of the lost at least one data packet.

16. The non-transitory computer readable medium of claim 14, the method further comprising:

based on the determining that the at least one data packet is lost outside the segment, which the user is looking at, ignoring the lost at least one data packet outside the segment.

17. The non-transitory computer readable medium of claim 14, wherein, a number of segments of the plurality of segments is received prior to the receiving of the receiving of the image divided into the plurality of segments.

* * * * *